(12) United States Patent
Lignon et al.

(10) Patent No.: US 9,217,640 B2
(45) Date of Patent: *Dec. 22, 2015

(54) GYROSCOPIC MEASUREMENT IN A NAVIGATION SYSTEM

(75) Inventors: Christian Lignon, Paris (FR); Yannick Foloppe, Paris (FR)

(73) Assignee: SAGEM DEFENSE SÉCURITÉ, Boulogne-Billancourt (FR)

( * ) Notice: Subject to any disclaimer, the term of this patent is extended or adjusted under 35 U.S.C. 154(b) by 445 days.

This patent is subject to a terminal disclaimer.

(21) Appl. No.: 13/641,459

(22) PCT Filed: Apr. 18, 2011

(86) PCT No.: PCT/FR2011/050890
§ 371 (c)(1),
(2), (4) Date: Oct. 15, 2012

(87) PCT Pub. No.: WO2011/128605
PCT Pub. Date: Oct. 20, 2011

(65) Prior Publication Data
US 2013/0031948 A1  Feb. 7, 2013

(30) Foreign Application Priority Data
Apr. 16, 2010  (FR) .................................... 10 01628

(51) Int. Cl.
*G01C 19/56* (2012.01)
*G01C 19/567* (2012.01)

(52) U.S. Cl.
CPC .............. *G01C 19/56* (2013.01); *G01C 19/567* (2013.01)

(58) Field of Classification Search
CPC ....................................................... G01C 19/56
See application file for complete search history.

(56) References Cited

U.S. PATENT DOCUMENTS 6,834,247 B2 * 12/2004 Hiedenstierna et al. ......... 702/85
7,040,162 B2 *  5/2006 Lehureau et al. ........... 73/504.12

(Continued)

FOREIGN PATENT DOCUMENTS

EP   1 491 856 A1   12/2004
EP   1 571 417 A2    9/2005

(Continued)

OTHER PUBLICATIONS

Shkel et al., "Type I and Type II Micromachined Vibratory Gyroscopes," IEEE, 2006.
International Search Report for PCT/FR2011/050890, mailed Apr. 20, 2012.

*Primary Examiner* — Herzon E Williams
*Assistant Examiner* — Mark A Shabman
(74) *Attorney, Agent, or Firm* — Marshall, Gerstein & Borun LLP

(57) ABSTRACT

A gyroscopic system provides measurements on the basis of a vibrating gyroscope and provides a measurement signal. A periodic control signal is applied to it; in order to rotate the position of vibration, during a half period, according to a first speed profile, from a first up to a second position; and in order to rotate the position of vibration in an opposite direction during the other part of the period, according to a second speed profile, up to a third position. The measurements are based on corrected signals, each of said corrected signals, respectively for each of the vibrating gyroscopes, being obtained by; deducting the control signal from the measurement signal of the vibrating gyroscope; and taking account of errors identified on the basis of a comparison of the measurements provided by the gyroscopic system as a function of the position of vibration with reference measurements.

17 Claims, 6 Drawing Sheets

(56) References Cited

U.S. PATENT DOCUMENTS

| | | |
|---|---|---|
| 7,281,426 B1 | 10/2007 | Chikovani et al. |
| 2007/0204802 A1* | 9/2007 | Davies .......................... 119/712 |

FOREIGN PATENT DOCUMENTS

| | | |
|---|---|---|
| FR | 2 755 227 A1 | 4/1998 |
| FR | 2 904 870 A1 | 2/2008 |

* cited by examiner

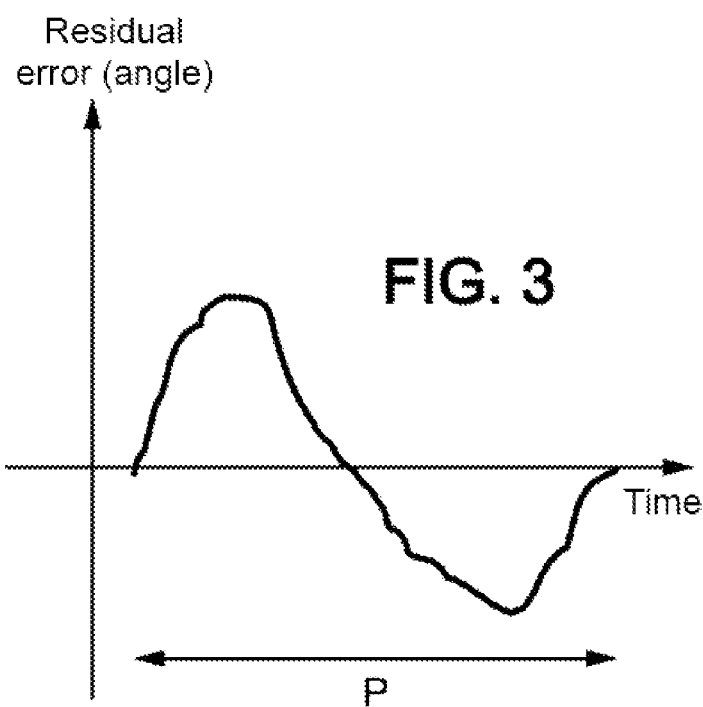
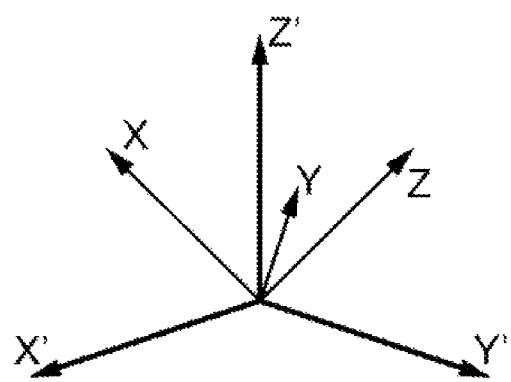

GYROSCOPIC MEASUREMENT IN A NAVIGATION SYSTEM

FIELD OF THE INVENTION

The invention relates to vibrating gyroscopes using a principle based on the Coriolis effect, and relates more particularly to the accuracy of measurements provided by this type of gyroscope.

BACKGROUND OF THE INVENTION

Such vibrating gyroscopes are conventionally used in inertial systems intended for navigation, such as a gyrocompass, for example, which provides an angle of measurement relative to the reference direction of true north (heading).

Axisymmetric Coriolis Vibrating Gyroscopes (CVG), for example Hemispherical Resonance Gyroscopes (HRG) more generally referred to as type I, such as those described in 'Type I and Type II micromachined vibrating gyroscopes' by Andrei M. Shkel, pages 586-593, IEEE/ION (Institute of Electrical and Electronics Engineer/Institute Of Navigation), PLANS 2006, San Diego, Calif., USA, operate in an open loop and allow measuring an absolute angle of rotation on the basis of a measurement of an angle representing the geometric position of vibration of the gyroscope relative to measurement electrodes.

Such a gyroscope may also be used in a closed loop, by controlling the geometric position of vibration via a precession control as is described in particular in document FR 2 755 227.

In that case, the geometric position of vibration of the gyroscope is maintained in a fixed position, and the measurement is deduced from the control that must be applied to the gyroscope to maintain it in that fixed geometric position of vibration. This type of operation is also called "rate gyro feedback." The values supplied by the physical measurement then no longer correspond to an angle but to a speed of rotation.

Whether used in open or closed loop, the measurements provided by these vibrating gyroscopes may contain errors which are particularly affected by the position of the vibration relative to the measurement electrodes. These errors therefore vary with the geometric position of vibration, and have the effect of degrading the level of precision of the values so measured. It is therefore useful to attempt to reduce these errors in order to improve the performance of this type of gyroscope in a gyroscopic system containing multiple gyroscopes of this type.

SUMMARY OF THE INVENTION

The invention aims to improve the situation.

A first aspect of the invention proposes a method for gyroscopic measurements supplied by a gyroscopic system comprising at least three vibrating gyroscopes,
- each of said gyroscopes vibrating in a first initial geometric position of vibration and supplying a measurement signal;
- wherein a periodic control signal is applied to each of said vibrating gyroscopes, over a time period, in order to:
  - rotate the geometric position of vibration in a first direction, during a first portion of the time period, according to a first speed profile, causing a change in the position of the vibration of said gyroscope from the first geometric position of vibration to a second geometric position of vibration; and
  - rotate the geometric position of vibration in a second direction opposite the first direction, during the other portion of the time period, according to a second speed profile, causing a change in the position of the vibration of said gyroscope from the second geometric position of vibration to a third geometric position of vibration;
- the control signal having a zero mean over the time period, and the first and second speed profiles indicating a variation in the speed of the change of geometric position of vibration over time; and
- wherein the measurements provided by the gyroscopic system are based on corrected signals,
- each of said corrected signals, respectively for each of the vibrating gyroscopes, representing a variation in the geometric position of vibration values and being obtained by:
  - subtracting the control signal from the measurement signal supplied by said vibrating gyroscope; and
  - taking into account errors identified on the basis of comparing measurements provided by the gyroscopic system as a function of the position of vibration, with reference measurements.

In one embodiment of the invention, a gyroscopic system comprises at least three vibrating gyroscopes, each one providing a measurement signal representing a variation in its geometric position of vibration over time. Such a system may correspond to a navigation unit.

The term "reference measurements" is understood to mean any type of reliable measurement that allows identifying the measurement errors supplied by the gyroscopic system by comparison with system measurements.

It is possible for the reference measurements to be supplied by a fourth gyroscope included in the gyroscopic system concerned.

It is also possible for the gyroscopic navigation system to comprise accelerometers, with the reference measurements then being provided as measurements of position and/or speed obtained on the basis of measurements supplied by said accelerometers.

When the system is included in a navigation unit that is at a standstill, or is at least substantially unmoving, this information at a standstill corresponds to the reference measurements and can then be provided by accelerometers of the navigation unit. These conditions may correspond to an alignment phase for the navigation unit.

Then, when the navigation unit (or more specifically the carrier of the unit) is in motion, it can easily be arranged to have another gyroscopic measurement means, to enable comparing the measurements supplied by the unit with a reference and thus deduce measurement errors in order to correct them. In this manner, accurate measurements are obtained from the navigation unit which no longer contain errors that could disrupt the measurement signals supplied by the vibrating gyroscopes.

In this context, it is possible to have a relatively inexpensive navigation unit (because it is based on vibrating gyroscopes) while offering a high level of reliability.

The term "geometric position of vibration" of a gyroscope is understood to mean the position of the standing wave. FIG. 1 illustrates such a standing wave.

The wave illustrated here has four nodes a, b, c, d and four anti-nodes e, f, g, h around the periphery of a hemispherical resonator 101. These four anti-nodes and four nodes alternate and are uniformly spaced forty-five degrees apart. The nodes are the points of minimum displacement on the standing wave, and the anti-nodes are the points of maximum displacement on the standing wave. The operation of the hemispherical resonance gyroscope requires accurate monitoring of the movement of the standing wave, which in turn requires that the location of the nodes and anti-nodes be accurately determined.

The position of this standing wave or the geometric position of vibration of a gyroscope can be made to rotate, so that the illustrated nodes and anti-nodes are not positioned as illustrated, but are shifted.

Advantageously, in one embodiment a periodic control signal can be applied over a time period to each of the three vibrating gyroscopes, in order to rotate the geometric position of vibration of the gyroscope in a first direction, for a portion of the time period and according to a first speed profile, then in an opposite direction according to a second speed profile. Thus the measurement signal supplied by the vibrating gyroscope to which this control signal is applied is based on measurements made in different geometric positions of vibrations, such that the measurement errors related to the geometric positions of vibration of the vibrating gyroscope can be canceled out or averaged. In addition, the periodic control signal which was applied to this measurement signal provided by the vibrating gyroscope concerned can be subtracted so as to ultimately obtain corrected gyroscopic measurements.

It should be noted that the control signals applied to the three vibrating gyroscopes may be similar or different.

Such a periodic control signal may correspond to a change, over a time period, in the geometric position of vibration in a first direction from the first to the second geometric position of vibration, this change in the geometric position of vibration occurring according to the first speed profile, then to a change in the geometric position of vibration in a second direction from the second to a third geometric position of vibration, this change of position occurring according to the second speed profile. Each of these speed profiles indicates a variation over time of the rotation speed applied to the geometric position of vibration via the control signal according to an embodiment of the invention.

In particular, it is possible for the third position to correspond substantially to the first position in the case where the carrier to which the gyroscopic system is attached does not impose a physical rotation in addition to the control signal in the vibrating gyroscope concerned. If such is not the case, however, the third position of vibration can be different from the first position.

By proceeding in this manner, it is advantageously possible to average the respective errors of the different vibrating gyroscopes. In effect, periodic control signals having a zero mean over their period are applied to the three vibrating gyroscopes of the system. In addition, errors are identified by taking into account measurements supplied by the gyroscopic system as a function of the position of vibration and the control signal. Here, advantageously, a feedback loop is implemented for the measurements output by the gyroscopic system in order to observe them as a function of variations in the position of vibration of the system's vibrating gyroscopes and variations in the control signal. With this feedback, each of the corrected signals supplied by one of the vibrating gyroscopes can advantageously also be corrected on the basis of such identified errors.

This feedback loop allows establishing a period for observing and identifying errors in the measurement signals supplied by each of the vibrating gyroscopes of the system, in comparison to reference measurements.

In one embodiment of the invention, the reference measurements are supplied by an external measurement signal.

Thus errors can be identified on the basis of a comparison between measurements supplied by the system and reference measurements supplied by an external measurement system which is then used as a reference. This measurement signal may be a GPS for example (Global Positioning System).

In one embodiment, the error identification is determined, for each of the vibrating gyroscopes, on the basis of a Kalman filter given as parameters the position of vibration of the vibrating gyroscope, the control signal, the measurements supplied by the gyroscopic system, and the reference measurements.

It is also possible to make use of a least squares method to identify the errors according to an embodiment of the invention.

The gyroscopic system may comprise three vibrating gyroscopes positioned in a triad, this triad having a trisection oriented on a substantially vertical axis.

The term "substantially vertical" is understood to mean that the trisection has an orientation which is essentially directed vertically, such that projections in the horizontal plane of the velocity components of the gyroscope measurements provide relevant and usable information.

Under these conditions, advantageously, the errors introduced into the measurements supplied by the vibrating gyroscopes of the gyroscopic system can be identified in an equivalent manner for the three vibrating gyroscopes of the gyroscopic system. More specifically, in navigation, the horizontal speed components are the most useful. By having a gyroscopic system as indicated above, it is advantageously possible to obtain horizontal components for the three vibrating gyroscopes in an equivalent manner, by projecting in the horizontal plane the measurements supplied by each one. Thus the identification of errors affecting the measurements supplied by each vibrating gyroscope can be conducted in an appropriate manner, taking into account each of the vibrating gyroscopes of the system.

In one embodiment of the invention, the first and second speed profiles are different for each of the vibrating gyroscopes of the gyroscopic system, these differences allowing the errors associated with the measurements from the three gyroscopes to be decorrelated from each other.

By applying different control signals to the different vibrating gyroscopes, it is advantageously possible to decorrelate the errors affecting their respective measurement signals. In order to introduce differences between the control signals in order to achieve such a decorrelation of the respective errors of the three vibrating gyroscopes, one can modulate the period of the control signal, or period of the precession cycles, or shift the periods of the control signals to be out of phase, i.e., phase shift the precession cycles of the three vibrating gyroscopes.

In one embodiment of the invention, the second speed profile corresponds to the inverse of the first speed profile as a function of time. The applied control signal is therefore symmetrical on each side of the middle of its time period.

In one embodiment, the first and second portions of the time period are identical.

In one embodiment, the measurement signal from the gyroscope and the control signal are expressed similarly to the measurements supplied by the gyroscopic system, meaning either in angle values or in angular velocity values. In this latter case, it is advantageously unnecessary to perform a signal integration before subtracting the control signal from the measurement signal.

With these arrangements, the measurements supplied by the gyroscopic system to a vibrating gyroscope may advantageously be based on a measurement signal supplied by the vibrating gyroscope for which the geometric position of vibration varies according to the first and second speed profiles.

The measurements supplied by the gyroscopic system may correspond to angular velocity values, each angular velocity value resulting from the division of a difference between two values for the geometric position of vibration of the corrected signal, separated by a whole number of time periods, by a time value corresponding to the whole number of time periods.

In one embodiment, before obtaining measurements from the gyroscopic system, the periodic signal is applied for a sufficiently long interval of time to be able to consider the control signal as a high frequency signal in comparison to the measurement signal from the vibrating gyroscope.

The time period and the first and second speed profiles of the control signal may be determined such that each integral of each of the speed profiles is equal to 2π/kN radians, where N is a frequency vibration mode of the vibrating gyroscope, and where k is a positive integer determined according to the order of the errors to be corrected.

A second aspect of the invention proposes a gyroscope measurement system comprising means for implementing a measurement method according to the first aspect of the invention.

Other features and advantages of the invention will be apparent from reading the following description. This is purely illustrative and is to be read with reference to the attached drawings, in which:

BRIEF DESCRIPTION OF THE DRAWINGS

FIG. 3 illustrates a residual error corrected by a feedback loop according to an embodiment of the invention;

FIG. 5 illustrates a configuration of a gyroscopic system according to an embodiment of the invention;

DETAILED DESCRIPTION

In general, axisymmetric vibrating gyroscope sensors conventionally present errors which depend on the electrical angle of the vibration, or position of vibration. These errors may arise from faulty calibration or aging of the sensor. Such an error can be expressed by the following equation:

$$\text{error} = \sum_{n=1}^{\infty} a_n \sin(nN\theta) + b_n \cos(nN\theta)$$

where:
θ is a value for the position of vibration,
n is an integer,
N is the frequency vibration mode of the vibrating gyroscope.

If an inertial system consists of three accelerometers and three axisymmetric vibrating gyroscopes, the accuracy of its measurements is potentially affected by this type of error which is particularly dependent on the position of vibration, particularly in the alignment phase of the inertial system or later on in a position calculation phase of this inertial system.

It should be noted that applying a periodic control signal having a period of zero mean to the different vibrating gyroscopes of the gyroscopic signal, meaning applying an alternating precession to the position of vibration of each vibrating gyroscope considered, already averages these errors. But the simple application of a precession control signal as described above does not reduce a certain residual error such as the one illustrated in FIG. 3. FIG. 3 illustrates a residual error (y axis) as a function of time (x axis) which may still affect the measurement signal from a vibrating gyroscope in alternating precession after having removed the control signal, over a period P of the control signal.

This is not a problem for a device such as a gyrocompass, as these devices use the gyroscopic information from a vibrating gyroscope averaged over several hours. Such is not the case, however, when the vibrating gyroscopes are used in an inertial navigation unit. In the context of a navigation unit, it is important to be able to compensate for gyroscopic errors which could have a large impact on both the alignment phase and the later phases of navigation.

Figure 1:
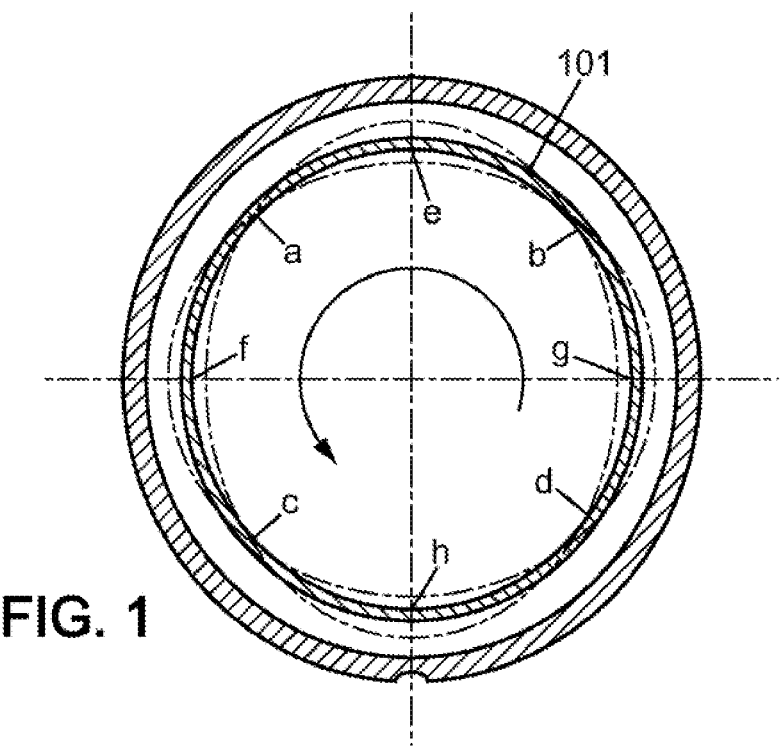
FIG. 1 illustrates a geometric position of vibration of a vibrating gyroscope.
Figure 2:
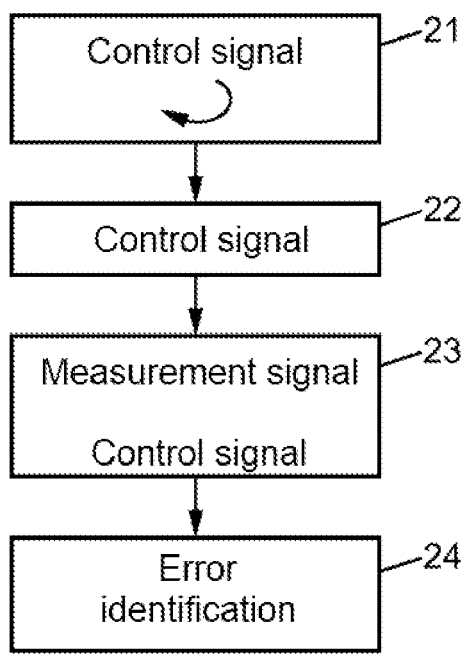
FIG. 2 illustrates the main steps of a measurement method by a gyroscopic system according to an embodiment of the invention.

FIG. 2 illustrates the main steps of a measurement method according to an embodiment of the invention, for a vibrating gyroscope of the gyroscopic system. From this it is easy to infer the application of the same type of steps to the other vibrating gyroscopes of the gyroscopic system, even if the respective control signals may be different for the different gyroscopes.

In step 21, a periodic control signal is applied in order to rotate the geometric position of vibration in a first direction, during a portion of the period of the periodic control signal. Due to this control signal, the geometric position of vibration of the vibrating gyroscope rotates in a first direction, at a speed which may vary over time according to a first profile. Thus the vibrating gyroscope moves from a first geometric position of vibration to a second geometric position of vibration. This first speed profile may also correspond to a constant speed, in which case the geometric position of vibration then varies in a continuous manner over the concerned portion of the time period.

Then in step 22, a control signal is applied in order to rotate the geometric position of vibration in a second direction opposite the first direction, during the other time period of the control signal. Here the control signal causes the position of the gyroscope vibration to change from the second geometric position of vibration to a third geometric position of vibration, this change occurring at a speed which may vary over time according to a second speed profile. The control signal has a zero mean over the period of the periodic control signal.

In one embodiment, the second speed profile corresponds to the first speed profile inverted, as a function of time. Thus the first and second speed profiles are symmetrical to each other relative to the center of the time period.

The vibrating gyroscope therefore next assumes a third geometric position which may correspond to the initial position of vibration, i.e., the geometric position of vibration after step 22, particularly in the case where the gyroscope is only subjected to the control signal according to an embodiment of the invention.

It should be noted that in an embodiment of the invention, the first and second speed profiles indicate a constant speed over time, therefore with a zero variation, which means that the position of vibration turns at a constant speed in both the first direction and the second direction.

This control signal is therefore a periodic precession signal adapted to apply an alternating precession to the vibrating gyroscope concerned in the gyroscopic system according to an embodiment of the invention.

Steps 21 and 22 are then repeated to obtain measurements from the vibrating gyroscope concerned over a certain time period while the gyroscope is precessing.

In such a context, it is advantageous to have a measurement signal from the vibrating gyroscope for different geometric positions of vibration. It is then sufficient to subtract, from the measurement signal of the vibrating gyroscope, the control signal applied to the vibrating gyroscope, in order to obtain a partially corrected signal in step 23. Control signal is understood here to mean a signal indicating a variation in angle values over time. In this case, when the measurement signal from the gyroscope corresponds to angle values, the subtraction between signals can be done directly, and when the measurement signal corresponds to angular velocity values, then the integral of the control signal is determined in order to obtain the control signal in the form of angle values to be able to subtract it from the measurement signal.

Next, each of the corrected signals obtained for each of the vibrating gyroscopes of the gyroscopic system additionally takes into account an error identification conducted in step 24 on the basis of comparing measurements supplied by the gyroscopic system as a function of the vibration position, with reference measurements.

Here, the signal output from the gyroscopic system is taken into account in a feedback loop during a phase of identifying errors in the measurements provided by the vibrating gyroscopes. By comparing the output signal from the gyroscopic system with a reference signal, residual errors of the type illustrated in FIG. 3 can be identified so they can be taken into account in the corrected signal by compensating for them in a reliable and appropriate manner. Such a method allows obtaining an inertial unit based on vibrating gyroscopes, thus reducing the costs while remaining capable of supplying reliable measurements both in an alignment phase and in later measurement phases conducted during use on a moving carrier.

The measurements provided by the gyroscopic system can then be based on the corrected signals which respectively represent variations in the values of the geometric position of vibration of the vibrating gyroscopes, after having subtracted the control signals from the measurement signal supplied by the gyroscope during steps 21 and 22 and after having compensated for the "residual" errors identified in steps 24 on the basis of comparing reference measurements with measurements output from the inertial unit.

In one embodiment of the invention, a gyroscopic system comprises:
three vibrating gyroscopes 402, each of said gyroscopes vibrating in a first initial geometric position of vibration and supplying a measurement signal;

a control unit 430 adapted to apply a periodic control signal over a time period, in order to:
rotate the geometric position of vibration in a first direction, during a portion of the time period, according to a first speed profile, causing a change in the position of the vibration of said gyroscope from the first geometric position of vibration to a second geometric position of vibration; and
rotate the geometric position of vibration in a second direction opposite the first direction, during the other portion of the time period, according to a second speed profile, causing a change in the position of the vibration of said gyroscope from the second geometric position of vibration to a third geometric position of vibration,
said control signal having a zero mean over said time period, and the first and second speed profiles indicating a variation in the speed of the change in geometric position of vibration over time; and
a processing unit 450 adapted to supply, for each of the three vibrating gyroscopes, a corrected signal representing a variation in the geometric position of vibration values and being obtained by:
subtracting 409 the control signal from the measurement signal supplied by said vibrating gyroscope; and
taking into account errors identified 410 on the basis of comparing measurements 406 supplied by the gyroscopic system as a function of the vibration position, with reference measurements;
wherein the measurements supplied by the gyroscopic system are based on the corrected signals.

Figure 4:
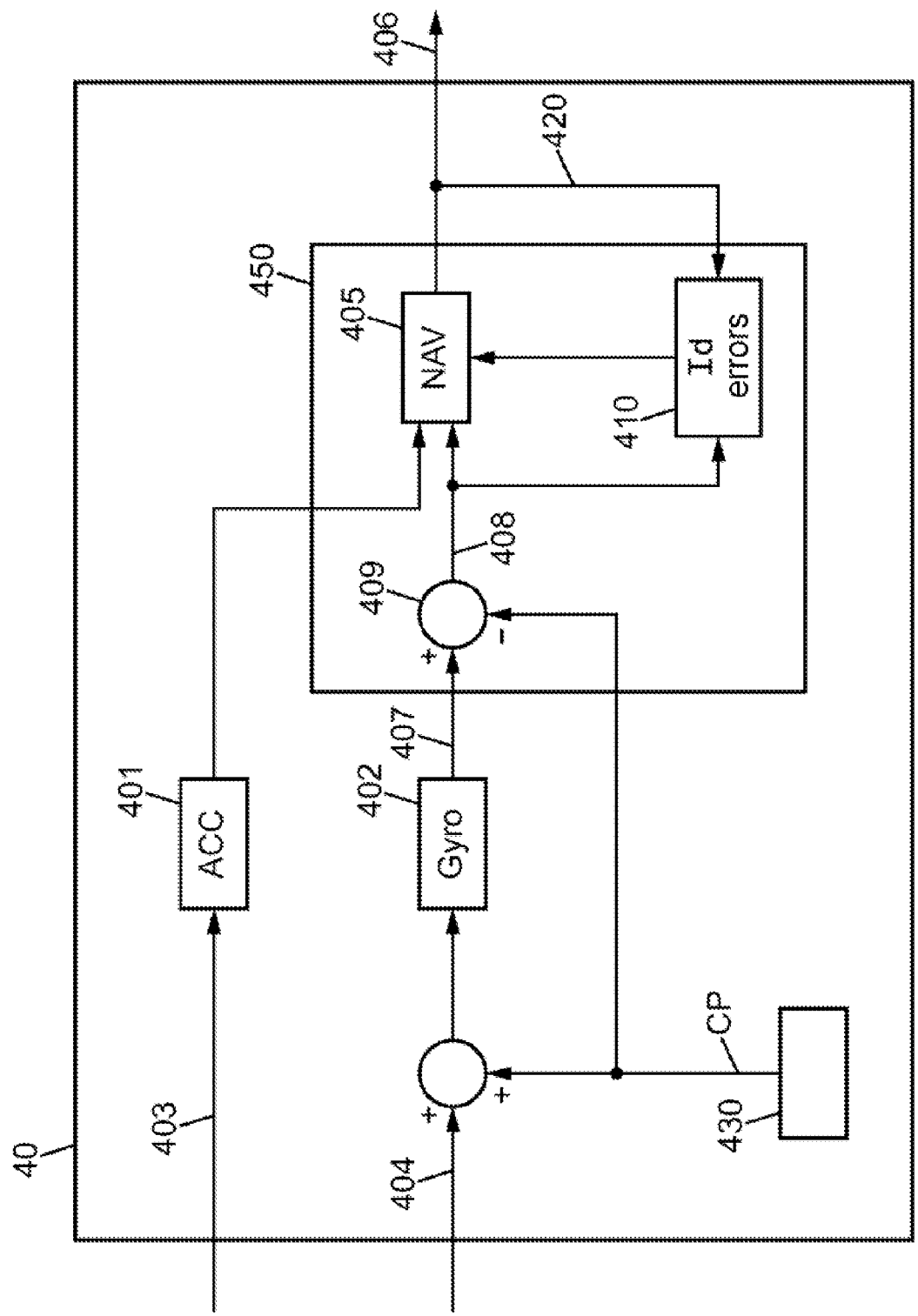
FIG. 4 illustrates an architecture of a gyroscopic system according to an embodiment of the invention.

FIG. 4 illustrates an architecture of a gyroscopic system according to an embodiment of the invention.

More specifically, such a gyroscopic system 40 comprises three accelerometers 401 as well as three vibrating gyroscopes 402 according to an embodiment of the invention. In the gyroscopic system 40 illustrated here, an acceleration 403 is measured by the accelerometers 401 and a rotation speed 404 is measured by the vibrating gyroscopes 402.

A navigation unit NAV 405 is responsible for processing the measurement signals from the accelerometers and from the vibrating gyroscopes, ultimately outputting 406 inertial measurements such as an attitude value, a position value, and a speed value.

In an embodiment of the invention, a control signal CP (Precession Control) is applied in addition to the rotation speed that each vibrating gyroscope of the system is experiencing. As a result, it should be noted that each vibrating gyroscope of the system supplies a measurement signal 407 that represents both the rotation speed it is experiencing within the system (related to the motion of the carrier) and the precession control CP or control signal applied according to an embodiment.

To each of these measurement signals 407 provided by a vibrating gyroscope of the system, the control signal which was applied to it CP is subtracted out by a subtractor 409. Next a signal 408 is obtained, which can be considered as partially corrected in the meaning of the invention. At this point this signal 408 is then corrected using errors identified according to the invention in an error identification unit 410. This correction of identified errors can be implemented at different levels in the processing sequence diagrammed in FIG. 4. For example, the signal 408 can be corrected within the navigation unit NAV 405 which is responsible for supplying the measurements from the gyroscopic system. This option is the one illustrated in FIG. 4. In this case, the processing unit 450 comprises the subtractor 409, the error identification unit 410, and at least a portion of the navigation unit 405, in which the corrected signals are obtained and used to supply the measurements output from the system in this embodiment. In fact, in this option, the residual errors identified in the error identification unit 410 are supplied to the navigation unit.

However, it is also possible to correct the signal 408 upstream from the navigation unit NAV 405 so that the signal this unit receives for each vibrating gyroscope is already corrected, with the control signal CP subtracted out and the residual errors identified by the identification unit 410 adjusted for. In this case, the processing unit then corresponds to the subtractor 409 as well as the error identification unit 410, and also to a module (not represented) upstream from the navigation unit 405 which receives the output from the identification unit 410 and the output from the subtractor 409 and supplies the navigation entity with a corrected signal for each gyroscope in the sense of an embodiment of the invention. The navigation unit 405 is then able to provide a reliable measurement signal 406.

Advantageously, a feedback loop 420 supplies measurements 406 from the gyroscopic system to the error identification unit 410. This error identification unit additionally receives the partially corrected signal 408 from the vibrating gyroscope concerned. This error identification unit 410 is then responsible for comparing these signals in order to reduce the residual errors according to an embodiment of the invention.

FIG. 5 illustrates an arrangement of a gyroscopic system according to an embodiment of the invention. More specifically, the axes X, Y and Z represent the axes of the triad of three vibrating gyroscopes in a gyroscopic system according to an embodiment of the invention. The trisection of this triad X, Y, and Z is then advantageously oriented vertically, unlike the other triad X', Y' and Z' also represented in this FIG. 5.

Figure 6:
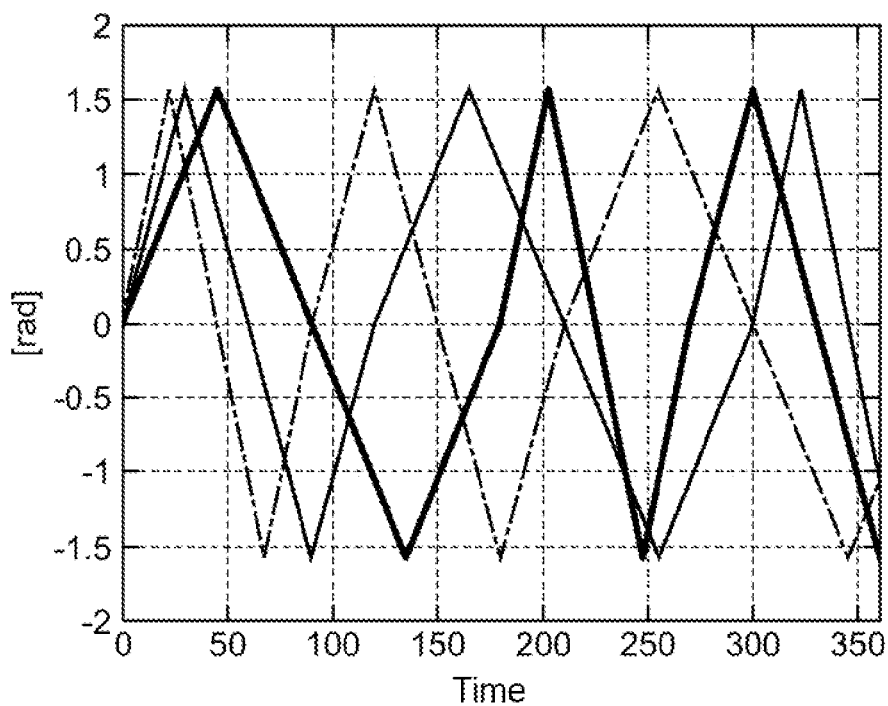
FIG. 6 illustrates an application of phase-shifted control signals according to an embodiment of the invention.

FIG. 6 illustrates an application of modulated control signals according to an embodiment of the invention. Such a difference advantageously allows decorrelating the respective errors connected to the measurement signals supplied by the vibrating gyroscopes.

Figure 7:
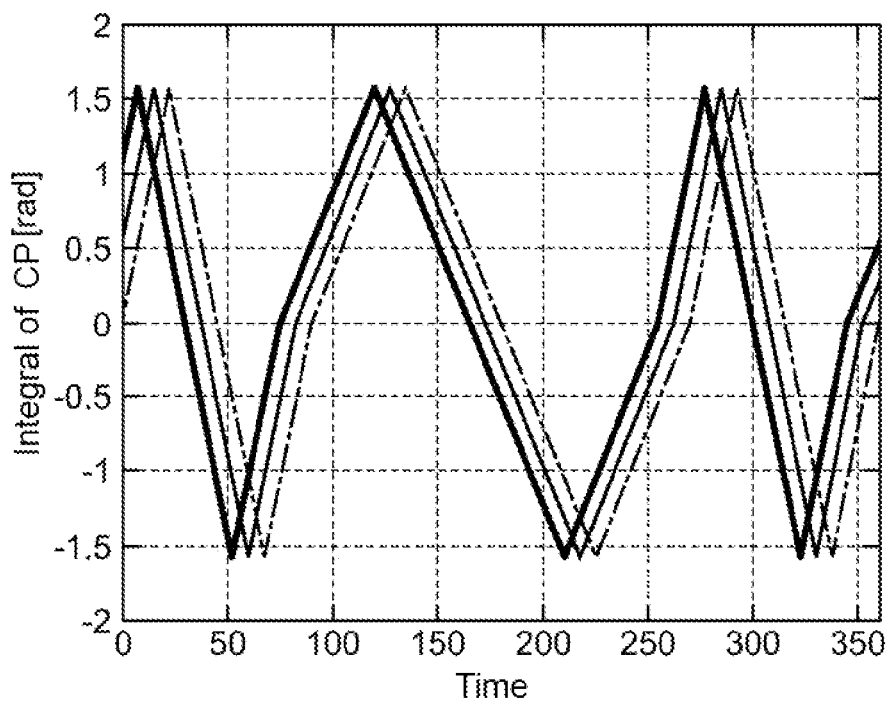
FIG. 7 illustrates an application of modulated control signals according to an embodiment of the invention.

FIG. 7 illustrates an application of phase-shifted control signals applied according to an embodiment of the invention. In this embodiment, the control signals respectively applied to the different vibrating gyroscopes are not in phase with each other. Such a difference advantageously allows decorrelating the respective errors connected to the measurement signals supplied by the vibrating gyroscopes.

No limitation is placed on the difference that can be introduced between the control signals to be applied to the vibrating gyroscopes in order to be able to separate the respective errors connected to the measurements supplied by the vibrating gyroscopes.

Figure 8:
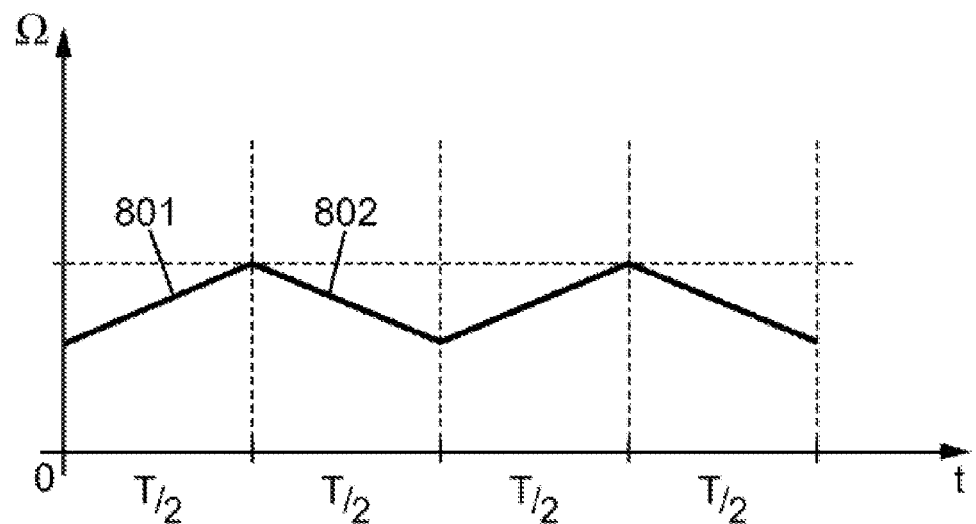
FIG. 8 illustrates first and second speed profiles over time, according to an embodiment of the invention.

FIG. 8 illustrates first and second speed profiles according to an embodiment of the invention. FIG. 8 illustrates the control signal over time, meaning the variation in the angular velocity Ω over time. Here, the angular velocity corresponding to the control signal for the change in geometric position of vibration of the gyroscope increases continuously over the first portion of the control signal and decreases, symmetrically and in the same manner as it increased, over the second portion of the period of the control signal. Thus portion 801 illustrates the first speed profile and portion 802 illustrates the second speed profile, these two speed profiles being temporally inverted relative to each other.

Then, for illustrative purposes only, the first and second speed profiles indicate a zero speed variation over time, or in other words a constant speed value.

Figure 9:
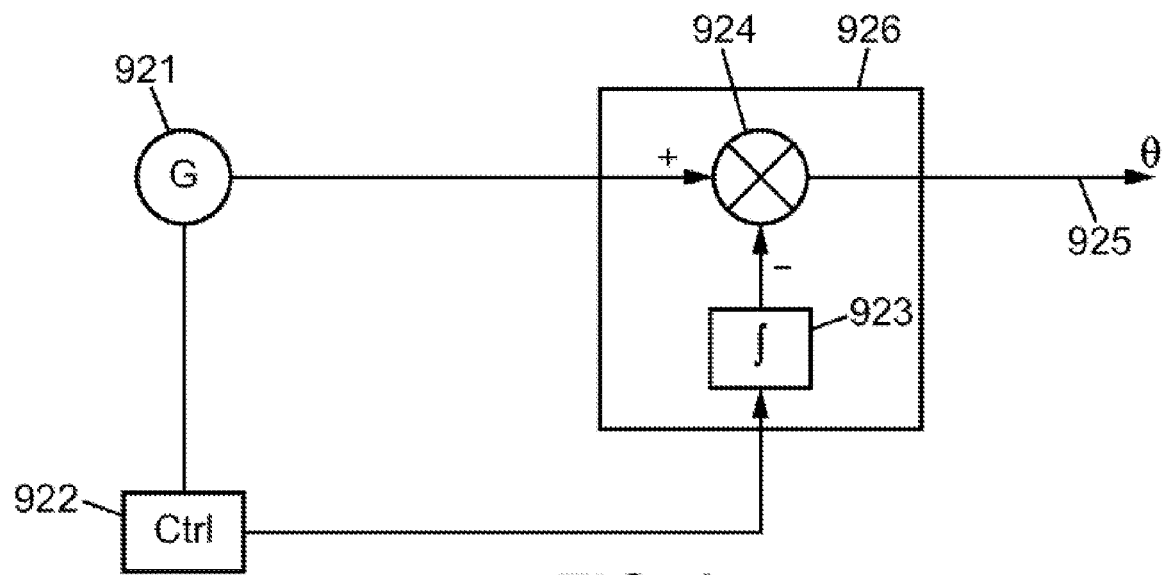
FIG. 9 illustrates an architecture of a gyroscopic system according to an embodiment of the invention.

FIG. 9 illustrates an architecture of a part of a gyroscopic system comprising means for implementing a part of the measurement method according to an embodiment of the invention. More specifically, the following sections detail the obtaining of a corrected signal by subtracting out a control signal according to an embodiment of the invention.

In one embodiment, a gyroscopic system comprises at least one vibrating gyroscope 921 adapted to receive and interpret control signals received from a control unit 922. Such a control unit 922 emits control signals in order to control a change in the geometric position of vibration of the gyroscope 921. More specifically, such a control unit 922 generates a control signal to cause the geometric position of vibration of the vibrating gyroscope to rotate at a constant angular velocity from a first to a second geometric position of vibration.

Such a gyroscopic system additionally comprises a processing unit 926, which receives the control signals from the control unit 922 and receives a measurement signal from the gyroscope 921.

The processing unit 926 comprises an integration unit 923 which receives the control signal emitted by the control unit 922, indicating the angle values, and integrates these control signals.

This processing unit 926 additionally comprises a signal subtractor 924 which receives the measurement signal from the vibrating gyroscope 921 and the integrated control signal supplied by the integration unit 923; the processing unit 926 outputs 925 a corrected signal.

It should be noted here that the corrected signal output from the processing unit is affected with error relative to the scale factor. As a result, a residual signal related to the control signal may still be present in the corrected signal, and may therefore impact the gyroscopic measurements provided by the gyroscopic system.

In order to eliminate this residual error relative to the scale factor, it is possible to apply the control signal over a fairly long interval of time so that the residual signal can be considered a high frequency signal and be filtered out. In this case, the filtration of the corrected signal can begin after this interval. Then, by continuing to apply the periodic control signal to the vibrating gyroscope, it is possible to provide reliable gyroscopic measurements for a sliding window of time corresponding to at least this interval of time.

For this purpose, it is possible to include a low-pass filter at the output 925 from the gyroscopic system illustrated in FIG. 9.

In one embodiment of the invention, a corrected signal of the angular velocity value may be output 925 instead of the angle value described above. In this context, the integration unit 923 is not required in the architecture if the control signal indicates the angle values directly.

Figure 10:
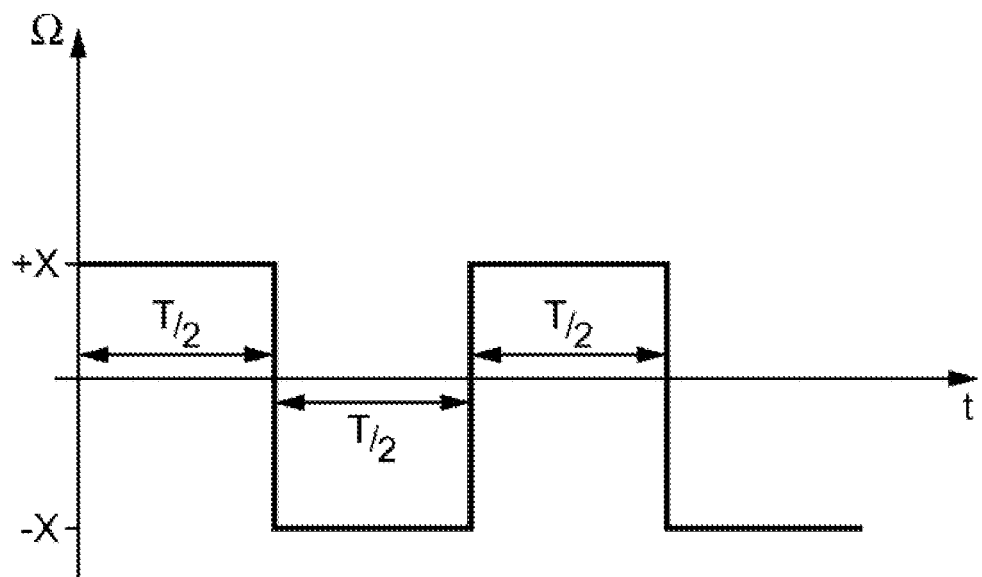
FIGS. 10 and 11 illustrate a control signal and its integration according to an embodiment of the invention.

FIG. 10 illustrates a control signal according to an embodiment of the invention. This signal is illustrated in a reference system representing time on the x axis and the rotation speed that is ordered at the geometric position of vibration of the vibrating gyroscope on the y axis. Here, the control signal is a rectangular signal representing the variations in the rotation speed applied to the vibrating gyroscope over time. Here, a rotation speed Ω alternating between the values X and −X is respectively applied to consecutive time period portions T/2. The rotation speed is therefore constant over each of the time period portions T/2 and is alternately positive and negative for two consecutive time period portions T/2. For example, a rotation speed value Ω of between 0.5 degrees per second and 20 degrees per second may be applied.

It should be noted here that in the embodiment in which the control signal is filtered, the shorter the control signal periodicity, the more quickly it is possible to supply a corrected signal and therefore reliable measurements from the gyroscopic system.

The control signal illustrated in FIG. 10 is provided to both the vibrating gyroscope 921 and the processing unit 926.

Figure 11:
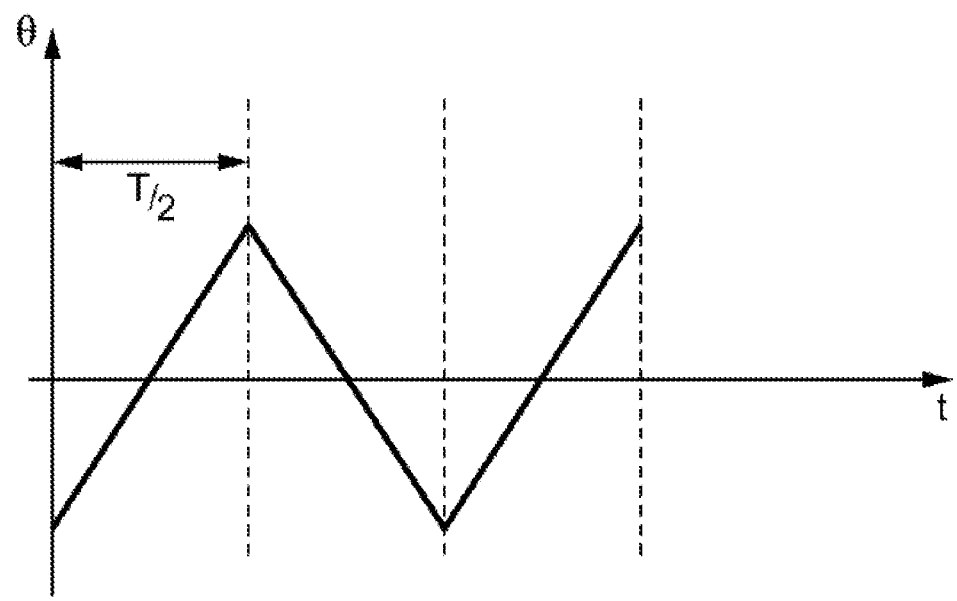

Upon receipt of the control signal at the processing unit 926, this control signal, which corresponds to the angular velocity value, is first integrated. Thus in an embodiment of the invention, the integration of the control signal as illustrated in FIG. 10 is output from the integration unit 923 in the form of a signal as illustrated in FIG. 11.

This signal is a triangular periodic wave of period 2T, therefore representing the variation of the geometric position of vibration of the vibrating gyroscope 921 over time.

By ordering a uniform change in the position of vibration over an angular range of $2\pi/kN$ radians, it is possible to average the errors in the measurement signal from the gyroscope according to the following equation, with the errors written in the form $\sin(nN\theta)$ or $\cos(nN\theta)$:

$$\int_{\theta_0}^{\theta_0+2\pi/kN} (a_n \sin(nN\theta) + b_n \cos(nN\theta)) \cdot d\theta$$

where N is the frequency vibration mode of the vibrating gyroscope;
where k is a positive integer;
where n is an integer corresponding to an order of error to be corrected; and
where $\theta_0$ is an initial geometric position of vibration of the vibrating gyroscope.

It should be noted that the integer k may be determined according to the order of the errors to be corrected in the measurement signal from the vibrating gyroscope. For a value of k equal to 1 and a vibrating gyroscope for which the frequency mode is equal to 2 (in other words, N=2), it is possible to average errors of any order that are related to the geometric position of vibration of the gyroscope.

For k equal to 1 and for a vibrating gyroscope for which the frequency mode is equal to 2, meaning for N equal to 2, the errors of order n greater than or equal to 1 are corrected according to the following equation:

$$\int_{\theta_0}^{\theta_0+\pi} (a_n \sin(2n\theta) + b_n \cos(2n\theta)) \cdot d\theta$$

N, the frequency vibration mode of a vibrating gyroscope, may for example be equal to 2, or to 3 as in the case of a vibrating gyroscope as described in document U.S. Pat. No. 7,281,426 for example.

It may be arranged so that the residual control signal related to the scale factor is subtracted from the measurement signal by determining a difference between a first angular value measured at the start of the period of the control signal and a second angular value measured at the end of this period, and dividing this difference by the value of the period.

It is also possible to take into consideration two geometric positions of vibration, occupied by the vibrating gyroscope at two times separated by one or more periods of the control signal. In this case, the difference between the two positions is divided by the number of periods that separate these two geometric positions of vibration.

An angular velocity value is therefore supplied here. Advantageously, this angular velocity value is corrected by the error related to the scale factor.

The invention claimed is:

1. Method for gyroscopic measurements supplied by a gyroscopic navigation system comprising at least three vibrating gyroscopes,
each of said gyroscopes vibrating in a first initial geometric position of vibration and supplying a measurement signal;
wherein a periodic control signal is applied to each of said vibrating gyroscopes, over a time period, in order to:
rotate the geometric position of vibration in a first direction, during a portion of the time period, according to a first speed profile, causing a change in the position of the vibration of said gyroscope from the first geometric position of vibration to a second geometric position of vibration; and
rotate the geometric position of vibration in a second direction opposite the first direction, during the remaining portion of the time period, according to a second speed profile, causing a change in the position of the vibration of said gyroscope from the second geometric position of vibration to a third geometric position of vibration;
said control signal having a zero mean over said time period, and the first and second speed profiles indicating a variation in the speed of the change of geometric position of vibration over time;
wherein the measurements provided by the gyroscopic system are based on corrected signals,
with each of said corrected signals, respectively for each of the vibrating gyroscopes, representing a variation in the geometric position of vibration values and being obtained by:
subtracting the control signal from the measurement signal supplied by said vibrating gyroscope; and
taking into account errors identified on the basis of comparing measurements supplied by the gyroscopic system as a function of the position of vibration, with reference measurements.

2. Method for gyroscopic measurements according to claim 1, wherein the reference measurements are supplied by an external measurement signal.

3. Method for gyroscopic measurements according to claim 1, wherein the gyroscopic navigation system comprises a fourth gyroscope, the reference measurements being supplied by said fourth gyroscope.

4. Method for gyroscopic measurements according to claim 1, wherein the gyroscopic navigation system additionally comprises accelerometers, the reference measurements being provided by measurements of position and/or speed obtained on the basis of measurements provided by said accelerometers.

5. Method for gyroscopic measurements according to claim 1, wherein the error identification is determined, for each of the vibrating gyroscopes, on the basis of a Kalman filter given as parameters the position of vibration of the vibrating gyroscope, the control signal, and the reference measurements.

6. Method for gyroscopic measurements according to claim 1, wherein the gyroscopic system comprises three vibrating gyroscopes positioned in a triad having a trisection oriented on a substantially vertical axis.

7. Method for gyroscopic measurements according to claim 1, wherein the first and second speed profiles are different for each of the vibrating gyroscopes of the gyroscopic system, the differences allowing the errors associated with the measurements from the three gyroscopes to be decorrelated from each other.

8. Method for gyroscopic measurement according to claim 1, wherein the measurements supplied by the gyroscopic system correspond to angular velocity values, each angular velocity value resulting from the division of a difference between two values for the geometric position of vibration for the corrected signal, separated by a whole number of time periods, by a time value corresponding to the whole number of time periods.

9. Method for gyroscopic measurement according to claim 1, wherein the time period and the first and second speed profiles of the control signal are determined such that each integral of each of the speed profiles is equal to $2\pi/kN$ radians, where N is a frequency vibration mode of the vibrating gyroscope, and where k is a positive integer determined according to the order of the errors to be corrected.

10. Gyroscopic system comprising:

three vibrating gyroscopes, each of said gyroscopes vibrating in a first initial geometric position of vibration and supplying a measurement signal;

a control unit adapted to apply a periodic control signal over a time period, in order to:

rotate the geometric position of vibration in a first direction, during a portion of the time period, according to a first speed profile, causing a change in the position of the vibration of said gyroscope from the first geometric position of vibration to a second geometric position of vibration; and rotate the geometric position of vibration in a second direction opposite the first direction, during the remaining portion of the time period, according to a second speed profile, causing a change in the position of the vibration of said gyroscope from the second geometric position of vibration to a third geometric position of vibration, said control signal having a zero mean over said time period, and the first and second speed profiles indicating a variation in the speed of the change in geometric position of vibration over time; and a processing unit adapted to obtain, for each of the three vibrating gyroscopes, a corrected signal representing a variation in the geometric position of vibration values and being obtained by:

subtracting the control signal from the measurement signal supplied by said vibrating gyroscope; and taking into account errors identified on the basis of comparing measurements supplied by the gyroscopic system as a function of the vibration position, with reference measurements, wherein the measurements supplied by the gyroscopic system are based on the corrected signals.

11. Gyroscopic system according to claim 10, wherein the reference measurements are supplied by an external measurement signal.

12. Gyroscopic system according to claim 10, wherein the gyroscopic navigation system comprises a fourth gyroscope, the reference measurements being provided by said fourth gyroscope.

13. Gyroscopic system according to claim 10, wherein the gyroscopic navigation system additionally comprises accelerometers, the reference measurements being supplied by said accelerometers.

14. Gyroscopic system according to claim 10, wherein the error identification is determined, for each of the vibrating gyroscopes, on the basis of a Kalman filter given as parameters the position of vibration of the vibrating gyroscope, the control signal, and the reference measurements as parameters.

15. Gyroscopic system according to claim 10, wherein the error identification is determined, for each of the vibrating gyroscopes, on the basis of a Kalman filter given as parameters the position of vibration of the vibrating gyroscope, the control signal, and the measurements supplied by the gyroscopic system.

16. Gyroscopic system according to claim 10, comprising three vibrating gyroscopes positioned in a triad having a trisection oriented on a substantially vertical axis.

17. Gyroscopic system according to claim 10, wherein the first and second speed profiles are different for each of the vibrating gyroscopes of the gyroscopic system, such that the errors associated with the measurements from the three gyroscopes are decorrelated.

* * * * *